(12) United States Patent
Hoy (10) Patent No.: US 9,925,906 B1
(45) Date of Patent: Mar. 27, 2018

(54) SELF-UNLOADING PIPE TRAILER

(71) Applicant: Philip L. Hoy, Gillette, WY (US)

(72) Inventor: Philip L. Hoy, Gillette, WY (US)

( * ) Notice: Subject to any disclaimer, the term of this patent is extended or adjusted under 35 U.S.C. 154(b) by 0 days.

(21) Appl. No.: 15/275,113

(22) Filed: Sep. 23, 2016

(51) Int. Cl.
*A01G 25/00* (2006.01)
*A01G 25/09* (2006.01)
*F16L 1/024* (2006.01)
*F16L 1/028* (2006.01)
*B60P 1/52* (2006.01)
*B60P 3/40* (2006.01)

(52) U.S. Cl.
CPC .. *B60P 1/52* (2013.01); *B60P 3/40* (2013.01)

(58) Field of Classification Search
CPC ......... F16L 1/0143; F16L 1/065; F16L 1/036; F16L 1/0243; B60P 1/38; B60P 3/00; A01D 87/121; B65G 13/065; B65G 67/20; E01C 19/2045; A01C 15/00; A01C 17/005; A01C 15/16; Y02P 60/214
USPC ............. 198/310, 529, 624, 782; 226/196.1; 405/174, 178, 179, 183, 184.5; 298/20 A, 298/20 R; 414/439, 528, 745.1, 745.4, 414/745.5, 745.6, 746.4, 746.7; 56/475
See application file for complete search history.

(56) References Cited

U.S. PATENT DOCUMENTS

| | | | | |
|---|---|---|---|---|
| 825,654 A | * | 7/1906 | Jessen ........................ | B60P 1/38 198/310 |
| 2,082,673 A | * | 6/1937 | Williamson ........ | E01C 19/2045 414/439 |
| 3,209,932 A | * | 10/1965 | Schiltz .................... | A01D 87/12 414/439 |
| 3,334,760 A | * | 8/1967 | Bolinger ................. | A01C 15/00 222/252 |
| 3,394,822 A | * | 7/1968 | Bethke .................. | B21B 39/008 193/36 |
| 3,415,400 A | * | 12/1968 | Olin ...................... | A01D 87/121 198/318 |
| 3,858,731 A | * | 1/1975 | Briggs .................... | A01G 25/09 198/394 |
| RE30,404 E | * | 9/1980 | Pereira ...................... | B60P 1/38 414/439 |
| 4,243,353 A | * | 1/1981 | Reed ...................... | B60P 1/6454 414/439 |
| 4,290,841 A | * | 9/1981 | Fukuhara .................. | B05D 7/20 156/464 |
| 4,355,940 A | * | 10/1982 | Derickson .............. | B65G 67/20 414/345 |

(Continued)

Primary Examiner — Gregory W Adams (57) ABSTRACT

A self-unloading pipe trailer carries a rack of pipe and automatically unloads segments as it moves along a pipeline location. A single operator can maneuver the trailer and operate the unload controls. In unload mode, the operator drives along the pipeline and the trailer unloads the segments automatically. The trailer employs a power pipe rolling assembly that engages with weight-bearing tires in order to translate the distance traveled across the ground to directly power a pipe unloading system such that each foot of ground travel equates to a foot of pipe unloading. If the operator needs to change speed and/or stop, it can be done without modifying the unload mode as the dispensing process automatically responds to the change in speed. There is no complex externally powered unloading system to breakdown, lose timing, or otherwise complicate matters. Pipe is simply unloaded automatically as the trailer moves down the pipeline.

6 Claims, 9 Drawing Sheets

(56) References Cited

U.S. PATENT DOCUMENTS

| | | | | |
|---|---|---|---|---|
| 5,042,645 | A * | 8/1991 | Pritchard | B64D 9/00 198/782 |
| 5,429,161 | A * | 7/1995 | Allard | B27B 31/06 144/242.1 |
| 6,279,730 | B1 * | 8/2001 | Schreger | B65G 13/065 198/722 |
| 7,435,047 | B2 * | 10/2008 | Meijer | B60P 1/52 193/35 R |
| 2010/0074689 | A1 * | 3/2010 | Lykins | B60P 3/00 405/154.1 |
| 2013/0129458 | A1 * | 5/2013 | Cheney | F16L 1/036 414/507 |

* cited by examiner

SELF-UNLOADING PIPE TRAILER

TECHNICAL FIELD

The present invention relates generally to the field of energy and pipeline development; and more particularly, to trailers for carrying pipe for pipelines; and more particularly still, to a self-unloading pipe trailer.

BACKGROUND

Pipelines provide an efficient, rapid, and relatively safe way to move materials across distances. With the recent rapid expansion in energy development, there has been an increasing need for pipelines, whether made from steel, polyethylene (also known as "poly") or some other material. However, placing all the segments or sections of pipe in a row, end-to-end, on or next to the pipeline location can be a labor-intensive, tedious and inefficient process. There are many different methods of completing this process currently known in the art. But because they all rely on manual labor or excessive human intervention, they are inefficient. What is needed is a self-unloading pipe trailer (and/or vehicle) that can unload pipe segments end-to-end along a proposed pipeline location efficiently, automatically, and with as little human intervention or management as possible.

SUMMARY

A self-unloading pipe trailer (SUP trailer) can comprise a stand-alone trailer, a skid unit which can slide onto a pre-existing trailer (such as a flatbed vehicle hauling trailer) or a pre-existing flatbed truck, or a stand-alone truck with the self-unloading pipe components attached thereto (either removably or permanently attached). The SUP trailer is pulled or otherwise maneuvered by a vehicle such as a semi-trailer truck tractor (as an example only), and is designed to carry a rack of pipe segments and automatically unload them as the vehicle moves along a pipeline location. The vehicle operator can operate the on/off unload controls from inside the vehicle, while detailed settings adjustments can be made either from the trailer or from inside the vehicle as well. Once the details have been selected, the vehicle operator simply drives forward along the pipeline location and the SUP trailer does the rest automatically. Although not described herein, welding or joining trailers are known in the art and can be pulled behind the SUP trailer to further automate and speed-up the pipeline creation process by joining the pipe segments as they are unloaded.

The SUP trailer employs a power pipe rolling assembly that selectively engages with the weight-bearing wheels/tires in order to translate the distance traveled across the ground to directly power a pipe dispensing system such that each foot of ground travel equates to a foot of pipe unloading. If the vehicle operator needs to slow-down, speed-up, or even stop the vehicle he/she can do so without worrying about the pipe dispensing process as it automatically and directly responds to the change in travel velocity. Additionally, there is no complex externally powered pipe unloading system to break-down, lose timing, or otherwise complicate matters. Pipe is simply unloaded automatically as the vehicle pulls the trailer down the proposed pipeline location.

DETAILED DESCRIPTION OF THE DRAWINGS

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below and in the accompanying Figures. The following detailed description provides a review of the drawing Figures in order to provide a thorough understanding of, and an enabling description for, these embodiments. One having ordinary skill in the art will understand that in some cases well-known structures, methods and functions have not been shown or described in detail to avoid unnecessarily obscuring the description of the embodiments.

Figure 1:
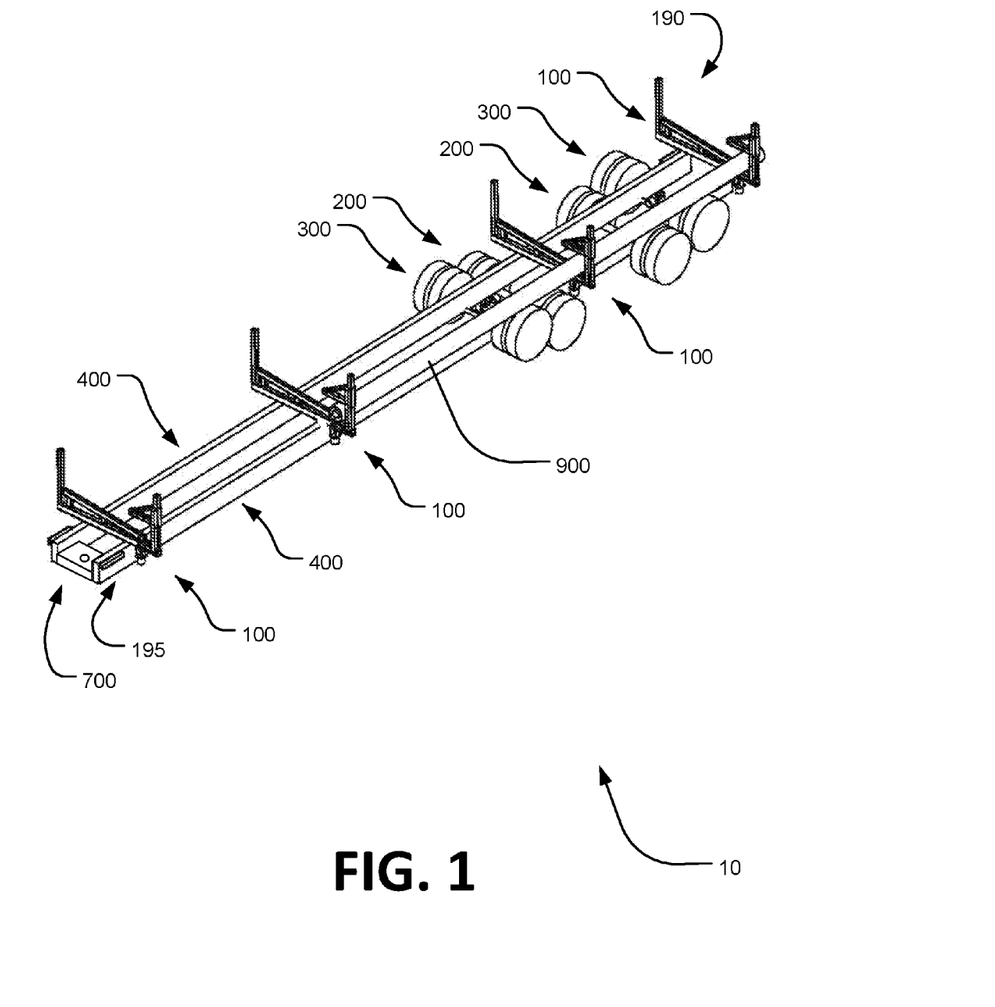
FIG. 1 illustrates a perspective top and side view of an exemplary embodiment of a self-unloading pipe trailer with a single pipe segment in the process of being discharged from the trailer.

Referring now to the drawings, FIG. 1 illustrates a perspective top and side view of an exemplary embodiment of a self-unloading pipe trailer 10 with a single pipe 900 in the process of being discharged from the trailer.

A self-unloading pipe (SUP) trailer 10 can haul and unload steel or poly pipe, or any other suitable types of pipe. The SUP trailer can be a complete trailer unit or it can comprise a skid unit which is designed to fit on hauling trailers, backhoe trailers, other flatbed trailers/trucks, or other styles of pre-made trailers.

The primary structural components of the SUP trailer 10 can be a plurality of longitudinal trailer frames 400. Each trailer frame 400 has a proximal end and a distal end. Near the proximal ends (and preferably in additional locations along their lengths), the plurality of trailer frames 400 are attached to one another to form a strong frame structure. Near the proximal end, the SUP trailer can be configured to turnably attach to a pulling vehicle via a trailer hitch device 700 in one embodiment. The trailer hitch device 700 can comprise any of the hitching technologies known in the art. In another embodiment, the trailer frame utilizes no hitch device 700 and instead comprises a slide that can be slid onto a flatbed trailer, flatbed truck, or other pre-existing vehicle.

The trailer frame structure comprising the plurality of trailer frames 400 has a first side and a second side. In one embodiment, the trailer can be configured to unload pipe from either side. Various sizes of frame and lengths may be used depending on customer load and operations demand.

A plurality of pipe cradle assemblies 100 can be attached perpendicularly (either permanently or removably) at spaced locations along the plurality of trailer frames 400. In one embodiment, the number of pipe cradle assemblies 100 is two or more. The pipe cradle assemblies 100 hold a stack of one or more pipe segments on the SUP trailer 10. Together, the plurality of pipe cradle assemblies 100 forms the pipe rack 190. The lowest portion of the pipe rack 190 comprises the pipe discharge chamber 195 from which a single pipe segment 900 at a time is unloaded from the SUP trailer 10. The plurality of pipe cradle assemblies 100 act in concert to feed the stack of pipe segments downwards, eventually ensuring that each pipe segment from the rack 190 is individually fed into the pipe discharge chamber 195 so that it can be automatically unloaded from the trailer 10.

The SUP trailer 10 can ride on a plurality of trailer weight bearing wheel assemblies 200. In one embodiment, the number of wheel assemblies 200 is two, in other embodiments, fewer or more wheel assemblies are used. Each trailer weight bearing wheel assembly 200 can comprise a left wheel arrangement and a right wheel arrangement and each arrangement can comprise a wheel rim and a tire attached thereto. In one embodiment, the left and right wheel arrangements each comprise dual wheel/tire configurations, as illustrated in FIG. 1, such that a single trailer weight bearing wheel assembly 200 can comprise four wheel/tire combinations: two right side wheels/tires and two left side wheels/tires. Other embodiments can have fewer or more wheel/tire combinations. In yet other embodiments, each wheel/tire combination can be replaced with unitary wheels wherein the wheel and tire are formed from a single unit. Other wheel/tire configurations can also be utilized.

The plurality of trailer weight bearing wheel assemblies 200 can each attach perpendicularly to at least one of the plurality of longitudinal trailer frames 400. Thus, at least a portion of the weight of the SUP trailer 10 and any pipe it holds is transferred through the trailer frames 400 to the plurality of trailer weight bearing wheel assemblies 200 and thence to the ground surface over which the trailer 10 is being pulled. Various sizes of wheels/tires may be used depending on customer load or operations demand.

When the trailer is configured as a slide, no weight bearing wheel assemblies are attached to the trailer frame and instead, the weight bearing wheel assemblies of the pre-existing flatbed trailer, truck or other vehicle are utilized.

In the embodiment illustrated in FIG. 1, two trailer weight bearing wheel assemblies 200 are shown. Arranged in proximity to each is a power pipe rolling wheel assembly 300. A plurality of power pipe rolling wheel assemblies 300 is utilized to unload a segment of pipe 900 from the discharge chamber 195. As illustrated in FIG. 1, each power pipe rolling wheel assembly 300 can utilize a plurality of wheel/tire arrangements. In one embodiment, the assembly 300 has a set of dual right wheels/tires and a set of dual left wheels/tires. In other embodiments, only a single set of either right or left dual wheels/tires may be utilized, or a combination thereof. Additionally, at least one of the power pipe rolling wheel assemblies 300 must have at least one drive wheel; i.e., at least one of the above described wheel/tire arrangements must comprise a drive wheel on at least one of the plurality of wheel assemblies 300.

In a preferred embodiment, the pipe segment 900 that is in the discharge chamber 195 rests upon and between the dual tires on either the left or right sets that comprise each of the plurality of power pipe rolling wheel assemblies 300. In the embodiment illustrated in FIG. 1, each power pipe rolling wheel assembly 300 comprises a set of two wheels (each wheel having its own tire thereon) on the left side of the trailer 10 and a set of two wheels (each wheel having its own tire thereon) on the right side of the trailer 10. In FIG. 1, the pipe discharge chamber 195 is located on the trailer's left side and so it is the left set of two wheels/tires for each of the plurality of power pipe rolling wheel assemblies 300 that engages the pipe segment 900. The pipe segment 900 can rest between the dual tires such that it is engaged by both. At least one of the wheel/tire arrangements on at least one of the power pipe rolling wheel assemblies 300 comprises the drive wheel and must engage the pipe segment in order to roll it off of the trailer.

As the trailer 10 is moved in a forwards direction by the pulling vehicle, the trailer weight bearing wheel assemblies 200 rotate (or the vehicle's weight bearing wheel assemblies rotate). When the vehicle driver activates the control to begin unloading pipe, the plurality of power pipe rolling wheel assemblies 300 are brought into engagement with the weight bearing wheel assemblies. Thus, as the weight bearing wheels rotate, the power pipe rolling wheels are forced to rotate in the opposite direction. Then, a demand for a first pipe segment to be dropped into the discharge chamber is made and the first pipe segment 900 from the pipe rack 190 is dispensed into the discharge chamber 195. The pipe falls into place in the gap between the two left side tires of each power pipe rolling wheel assembly 300. The weight of the pipe, a plurality of pipe retention assemblies 500 (see FIGS. 4, 5, and 8), and/or additional upper retention rollers keep the pipe in place on and/or in the gap between the tires as the plurality of power pipe rolling wheel assemblies 300 rotate and feed the pipe 900 down the length of the discharge chamber, ultimately unloading it from the rear of the trailer 10.

In such a configuration as that shown in FIG. 1, the gap between the tires on either side of the plurality of power pipe rolling wheel assemblies 300 can be adjusted to account for varying diameter pipe. Similarly, the size of the wheels/tires used, the tread on the tires, and the material content of the tires, can each be adjusted to account for variations in pipe characteristics while maintaining efficient pipe unloading. Although it is preferable that multiple wheel/tire arrangements be employed for each of the power pipe and weight bearing assemblies, only one of the power pipe wheel/tire arrangements must be a drive wheel that contacts the pipe segment and unloads it from the trailer. Similarly, at least one of the weight bearing wheel/tire arrangements can contact at least one of the power pipe wheel/tire arrangements and either that power pipe wheel/tire arrangement or another to which it is rotatably connected can comprise the at least one drive wheel.

As illustrated in FIG. 1, the exemplary plurality of power pipe rolling wheel assemblies 300 is designed so that pipe segments can be unloaded off of either the right or left side of the trailer. With the pipe cradle assemblies 100 configured as illustrated in FIG. 1, the pipe segments unload off of the trailer's left side. However, by simply rotating the plurality of pipe cradle assemblies 100 one hundred and eighty degrees around a vertical axis, the trailer 10 can be reconfigured so that the discharge chamber 195 would be on the trailer's right side. In one embodiment, in order to switch the discharge side, the plurality of pipe cradle assemblies 100 are simply detached from the plurality of trailer frames 400, rotated one hundred and eighty degrees, and reattached to the plurality of trailer frames 400. In another embodiment, in order to switch the discharge side, the plurality of pipe cradle assemblies 100 are simply detached from the plurality of trailer frames 400 and a plurality of right-side-discharge pipe cradle assemblies 100 are attached to the plurality of trailer frames 400. In yet another embodiment, only some of the sub-components that make up each cradle assembly are swapped out or rotated. Alternatively, in yet another embodiment, a right-discharge trailer and a left-discharge trailer can be produced.

In order to further accommodate pipe segments of different diameters, the height of each of the plurality of power pipe rolling wheel assemblies 300 can be adjusted in some embodiments. An additional feature that can be incorporated in some embodiments is a brake system to prevent the wheel assemblies 300 from rotating when the plurality of power pipe rolling wheel assemblies 300 are disengaged from the weight bearing wheel assemblies (i.e, when the trailer is not in an "unload/discharge" mode, but is instead in a transport only mode).

Figure 2:
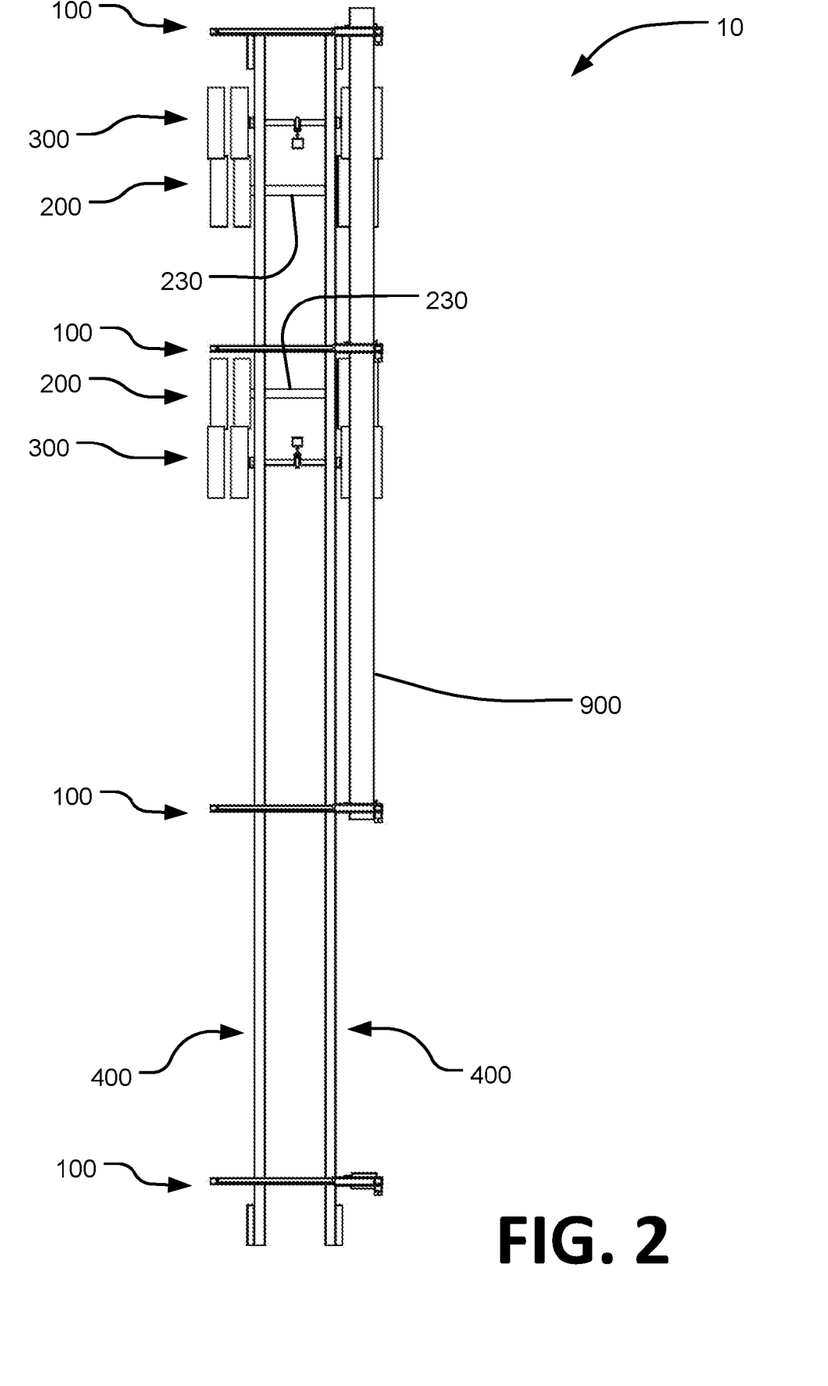
FIG. 2 illustrates a top plan view of an exemplary embodiment of a self-unloading pipe trailer with a single pipe segment in the process of being discharged from the trailer.

FIG. 2 illustrates a top plan view of an exemplary embodiment of a self-unloading pipe trailer 10 with a single pipe segment 900 in the process of being discharged from the trailer 10. Note that the pipe segment 900 has already begun to protrude beyond the rear of the trailer 10.

In this top view, a load bearing axle 230 is illustrated as extending perpendicularly to the plurality of longitudinal trailer frames 400. The load bearing axle 230 can connect a left wheel arrangement to a right wheel arrangement in order to comprise each trailer weight bearing wheel assembly 200. In other embodiments, a single full-length axle may be replaced by two shorter length axles. Various sizes, types and numbers of axles may be used depending on customer load or operations demand. Similarly, offset axles or other types of axle/wheel configurations may be employed as desired.

Figure 3:
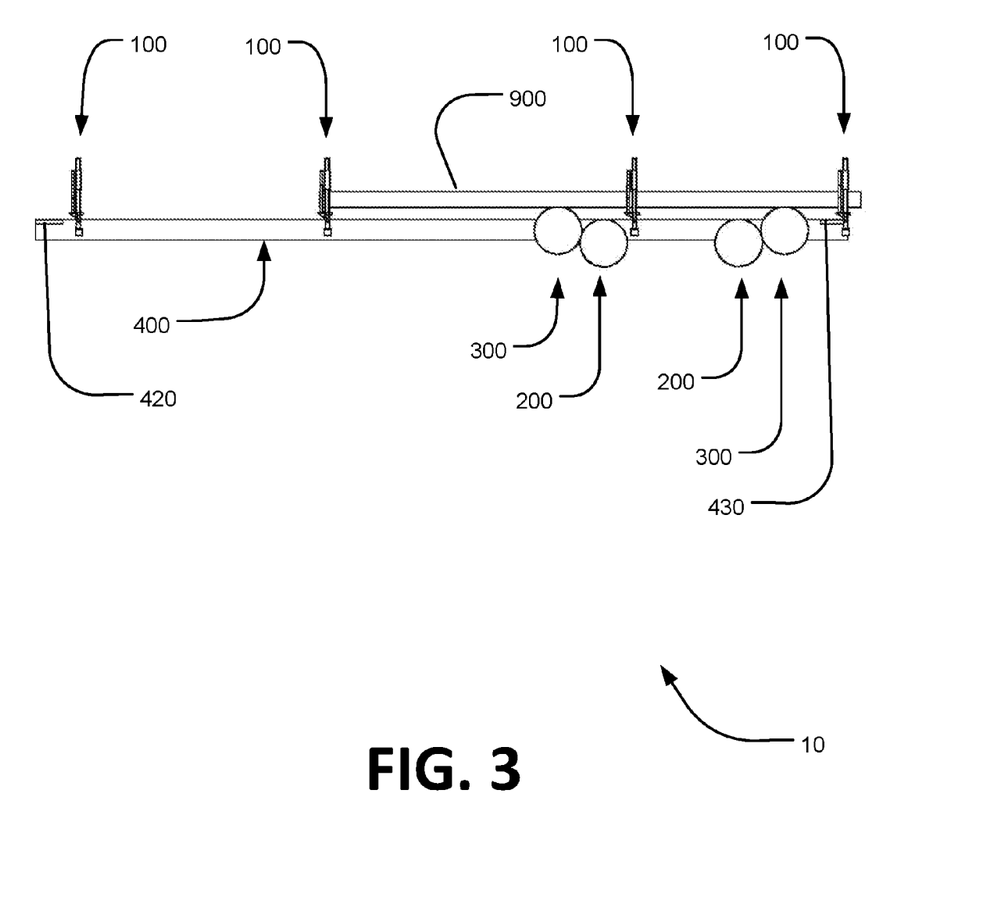
FIG. 3 illustrates a left side elevation view of an exemplary embodiment of a self-unloading pipe trailer with a single pipe segment in the process of being discharged from the trailer.

FIG. 3 illustrates a left side elevation view of an exemplary embodiment of a self-unloading pipe trailer 10 with a single pipe segment 900 in the process of being discharged from the trailer 10. Note how the plurality of power pipe rolling wheel assemblies 300 are engaged with the plurality of trailer weight bearing wheel assemblies 200 when the trailer 10 is in an unloading/discharge mode as illustrated in FIG. 3. In one embodiment, if the vehicle operator were to disengage the unloading/discharge mode and instead place the trailer in transport mode, the plurality of power pipe rolling wheel assemblies 300 would disengage from the plurality of trailer weight bearing wheel assemblies 200 and swing downwards and away therefrom.

Figure 8:
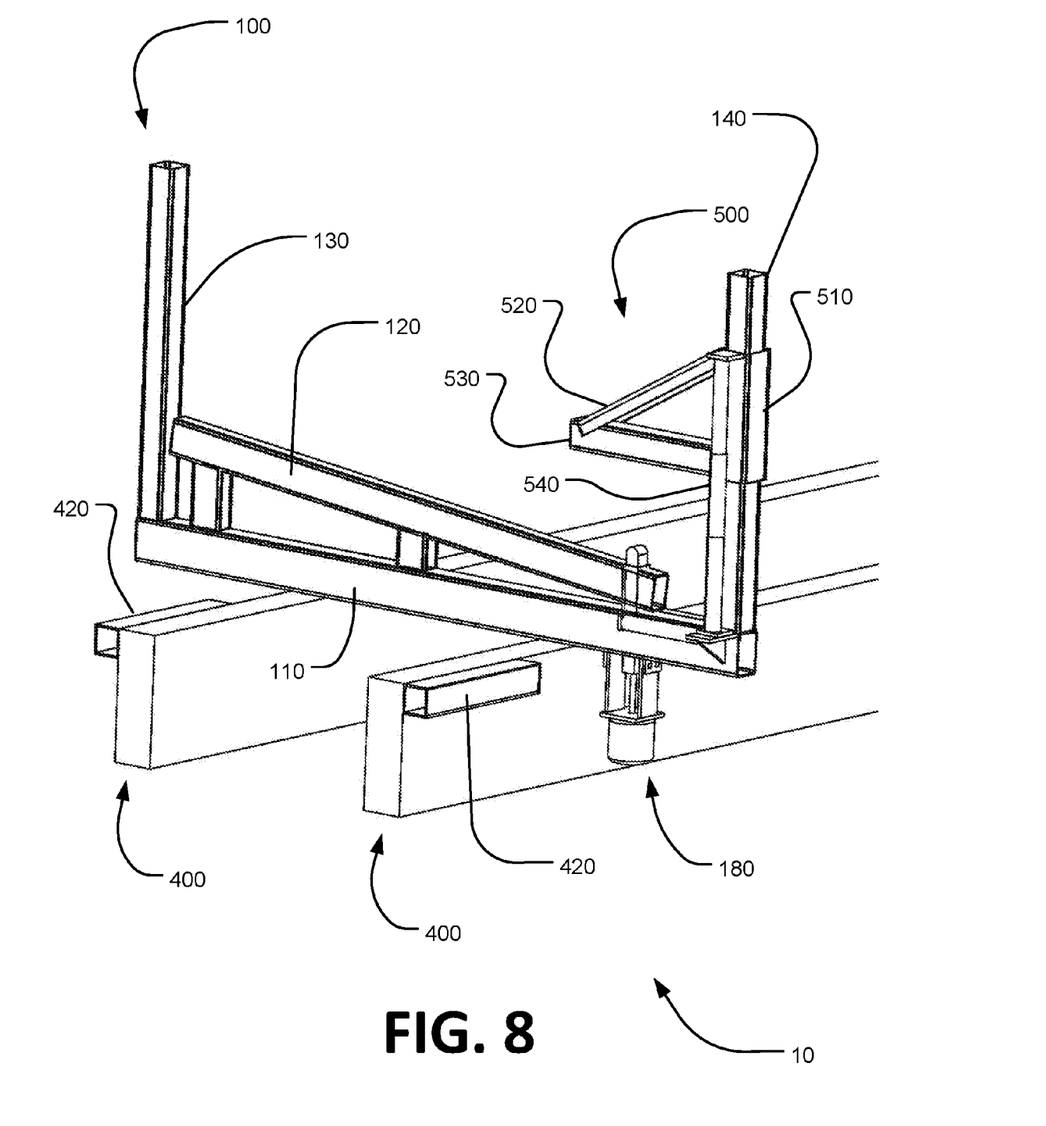
FIG. 8 illustrates a close-up perspective view of an exemplary embodiment of a front end of a self-unloading pipe trailer highlighting an exemplary pipe cradle assembly.

Additional components referenced in FIG. 3 include a plurality of head board attachments 420 (at least one on each side of the trailer, only one is visible in FIG. 3, compare to FIG. 8). The attachments 420 allow a headboard to be added to the trailer 10 to prevent any pipe segments in the pipe rack 190 from sliding forwards in the rack (during transport or otherwise).

Similarly, a plurality of tail board attachments 430 provides a similar function at the distal end of the trailer. Again, only one is visible in FIG. 3, compare this view to the two illustrated in FIG. 2 (no reference numbers are shown in FIG. 2 so as not to unduly detract from other features highlighted in FIG. 2). The tail board attachments 430 are designed to allow a tailboard to be added to the trailer to prevent pipe from sliding rearwards in the rack (during transport or otherwise). A tail board should have one or more gates therein that can be opened when the vehicle operator wishes to begin unloading pipe segments out the back of the trailer. The headboard and tailboard may be adjustable to accommodate various lengths of pipe segments.

Figure 4:
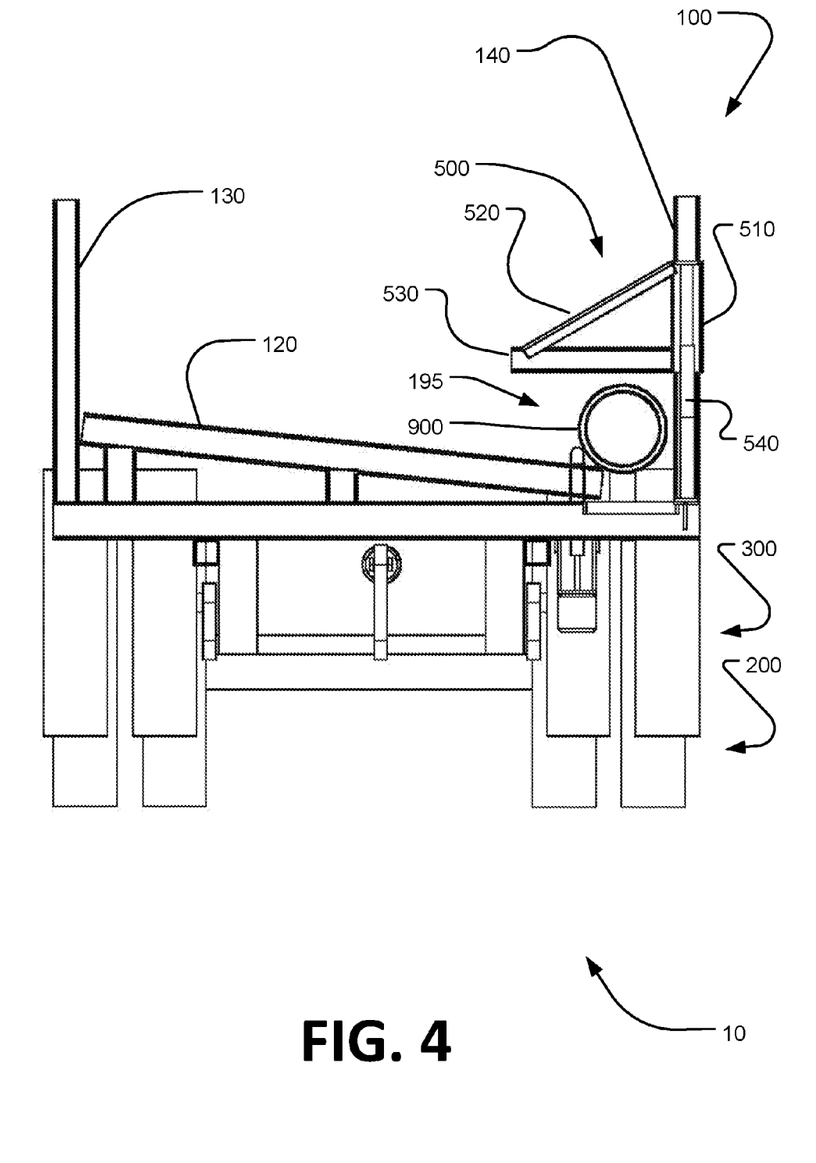
FIG. 4 illustrates a front end elevation view of an exemplary embodiment of a self-unloading pipe trailer with a single pipe segment in the process of being discharged from the trailer.

FIG. 4 illustrates a front end elevation view of an exemplary embodiment of a self-unloading pipe trailer 10 with a single pipe segment 900 in the process of being discharged from the trailer 10. For clarity, a number of known components (such as an attachment apparatus to attach the trailer to a pulling vehicle) have been excluded from illustration in FIG. 4 so as not to obfuscate those novel components highlighted in FIG. 4. For example, the discharge chamber 195 can be seen in FIG. 4 with a pipe segment 900 therein. Note how the pipe 900 is positioned on top of and between the two tires of the power pipe rolling wheel assembly 300.

In the illustration shown in FIG. 4, one of a plurality of pipe retention assemblies 500 is visible. In one embodiment, each of the plurality of pipe cradle assemblies 100 would have a pipe retention assembly. In other embodiments, some pipe cradle assemblies might not have a pipe retention assembly 500.

A pipe retention assembly 500 can comprise a pipe retention upright mount 510 that is configured to adjustable slide up and down a low side pipe cradle upright 140. The low side pipe cradle upright 140 works in concert with the high side pipe cradle upright 130 to contain the pipe segments within the plurality of pipe cradle assemblies 100.

The uprights 130 and 140 can be in pockets in the trailer in one embodiment so that they are easily removed and replaced, as needed. In another embodiment, the cradle structure 100 is integrated and the uprights are not easily removed therefrom. The uprights can comprise two or more smaller uprights that are pocketed together (or otherwise attached to each other) and then secured. This allows the uprights to be extended or shortened by adding or subtracting smaller uprights therefrom depending on how tall the overall pipe rack needs to be.

In embodiments that have only sub-components of the cradles 100 that are swapped or rotated when the trailer is reconfigured to discharge pipe from the opposite side (versus those in which the entire cradle is rotatable), the entire pipe retention assembly 500 can be detached from the low side upright 140 and moved to the high side upright 130 (which, in effect, becomes the new low side upright once the reconfiguration is complete). Alternatively, the pipe retention assembly 500 stays on the low side upright 140, and instead, the locations of the low side upright 140 and the high side upright 130 are simply swapped when the trailer is reconfigured to discharge pipe from the other side.

In embodiments when the entire pipe retention assemblies 500 are slideable/adjustable on the low side upright 140, they can be adjusted to increase or decrease the height of the discharge chamber 195 to accommodate larger or smaller diameter pipe segments 900.

A pipe retention feeder support bar 520 can extend downwards and outwards from the pipe retention upright mount 510. The feeder support bar 520 attaches to the pipe retention bar 530 which itself also extends from the upright mount 510. The feeder support bar 520 can be fairly sharply angled downwards so as to direct and feed stacked pipes downwards towards the pipe roller bar 120.

The pipe retention bar 530 defines the upper limits of the discharge chamber and ensures that pipe segments being discharged from the rear of the trailer remain in the discharge chamber as they are unloaded from the trailer 10. Relatively close spacing between the top of the pipe segment 900 being unloaded and the bottom of the pipe retention bar 530 helps to prevent multiple pipe segments from rolling into the discharge chamber. Furthermore, the pipe retention bar 530 helps to prevent other pipe segments in the pipe rack from resting on top of the pipe segment 900 being unloaded.

In one embodiment, each of the plurality of pipe retention assemblies 500 can further comprise a pipe retention jack 540 mounted between the pipe retention assembly 500 and the cradle 100 on which the retention assembly 500 is attached. The pipe retention jack 540 allows the pipe retention assembly 500 to be raised/lowered relative to the tops of the power pipe rolling wheel assemblies 300. This adjusts the height of the discharge chamber 195 to more precisely match the diameter/size of the pipe being unloaded.

Each of the plurality of pipe cradle assemblies 100 can further comprise a pipe roller bar 120. The pipe roller bar is angled to direct pipe segments downwards towards the discharge chamber. Segments simply roll down the pipe roller bar 120 whenever the discharge chamber is empty and a new pipe segment needs to be unloaded. In one embodiment, the pipe roller bar 120 is removably attached such that it can be removed and reversed to facilitate pipe unloading from the opposite side of the trailer 10. In another embodiment, the pipe roller bar 120 is more permanently affixed within the cradle assembly 100, and instead the entire cradle assembly (or a large portion thereof) is removable and reversible as described above.

Figure 5:
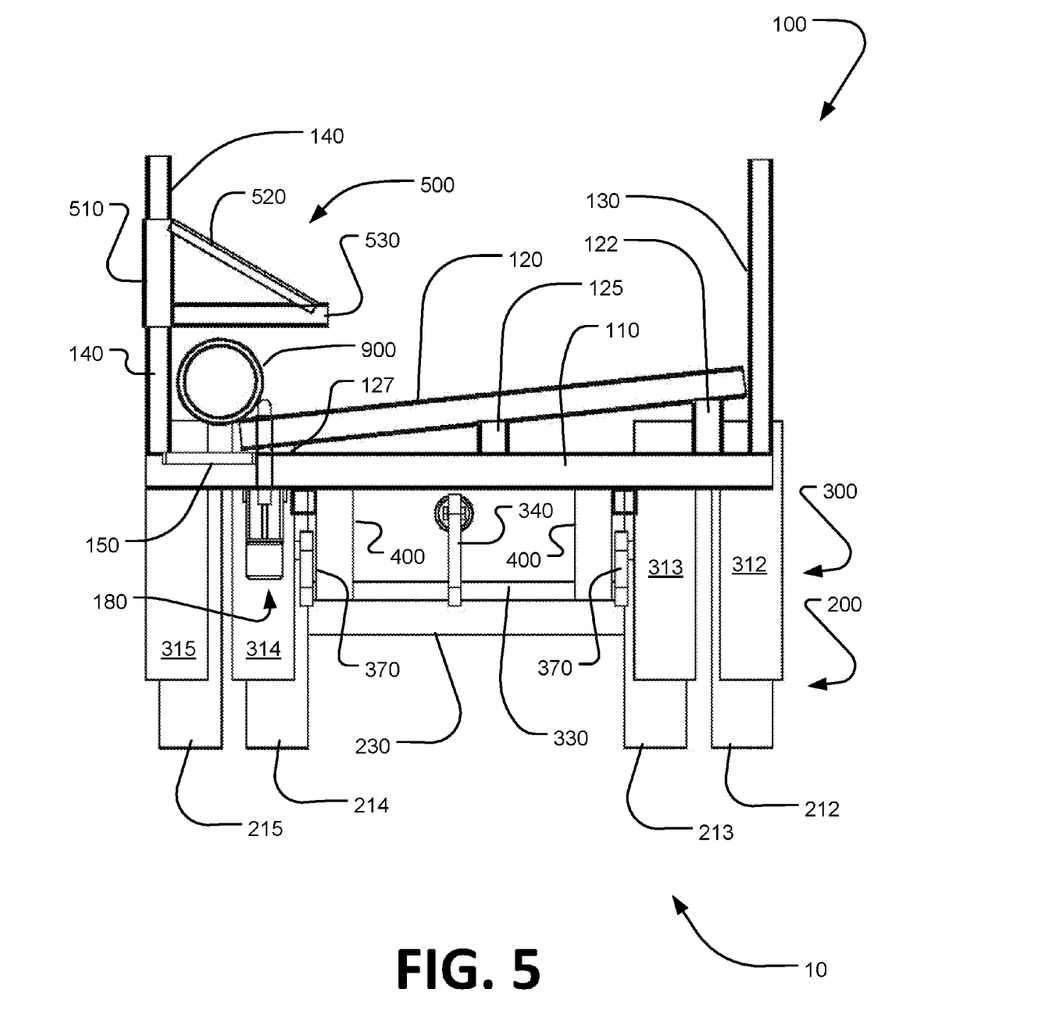
FIG. 5 illustrates a rear end elevation view of an exemplary embodiment of a self-unloading pipe trailer with a single pipe segment in the process of being discharged from the trailer.

FIG. 5 illustrates a rear end elevation view of an exemplary embodiment of a self-unloading pipe trailer 10 with a single pipe segment 900 in the process of being discharged from the trailer. In this view, additional components of each of the pluralities of pipe cradle assemblies 100, trailer weight bearing wheel assemblies 200, and power pipe rolling wheel assemblies 300 are illustrated.

An exemplary pipe cradle assembly 100 is shown in FIG. 3 with a pipe cradle main beam 110 extending generally horizontally and placed generally perpendicular to the longitudinally extending trailer frames 400. The main beam 110 provides the underlying structure of the pipe cradle assembly 100. Mounted onto the main beam is the pipe roller bar 120. As the pipe roller bar 120 is angled and the main beam 110 is relatively horizontal, a plurality of roller bar supports of varying heights are placed therebetween. The roller bar high support 122 is mounted on the high side of the pipe roller bar 120 and spaces the high side of the roller bar 120 at the greatest distance above the pipe roller bar 120. Towards the center of the roller bar 120 is mounted the roller bar mid support 125. Since it is shorter than the high support 122, the pipe roller bar 120 angles downwards from the high support 122 to meet the top of the mid support 125. Similarly, the roller bar low support 127 is mounted on the low end of the pipe roller bar 120 and serves as a very low spacer between the roller bar 120 and the main beam 110.

The high side pipe cradle upright 130 extends upwards on the high side of the main beam 110 and forms the high side of the pipe cradle assembly 100. This upright 130 is on the non-unloading side of the cradle and serves to hold the pipe segments in the pipe rack.

The low side pipe cradle upright 140 extends upwards on the low side of the main beam 110 and forms the low side of the pipe cradle assembly 100. This upright 140 is on the unloading side of the cradle and serves to hold the pipe segments in the pipe rack.

A plurality of pipe carrying rollers 150 can be attached in various locations on or near the cradles and/or elsewhere throughout the trailer as needed to assist in the smooth unloading of pipe segments and the otherwise smooth movement of pipe segments throughout the trailer.

Extending upwards from one or more of the pipe roller bars 120 is a pipe stop assembly 180. The pipe stop 180 projects between the rack of stacked pipe segments and the discharge chamber to ensure that only one pipe segment is in the unload position at a time. The pipe stop assembly 180 can use infrared eye(s) and/or other sensors to ensure it operates correctly; remaining in an upright position until a pipe segment is called for, then dropping to allow a pipe segment to roll into the unload position within the discharge chamber, then raising once again to hold the remaining pipes in the rack while the pipe segment in the unload position is unloaded from the trailer. Once the pipe segment is clear, the pipe stop assembly can activate once again, dropping to allow the next pipe segment to roll into the unload position, and the process is repeated.

An exemplary trailer weight bearing wheel assembly 200 is illustrated in FIG. 5. This particular embodiment is illustrated as comprising four weight bearing tires 212, 213, 214 and 215. In other embodiments, the number of weight bearing wheels/tires can be fewer than or more than four. The wheels/tires are attached to one another and to the trailer frame 400 by one or more load bearing axles 230. Various sizes of wheels/tires may be used depending on customer load or operations demand.

An exemplary power pipe rolling wheel assembly 300 is illustrated in FIG. 5. This particular embodiment is illustrated as comprising four pipe rolling tires 312, 313, 314 and 315. In other embodiments, the number of pipe rolling wheels/tires can be fewer than or more than four. The pipe rolling wheels/tires 312 and 313 on the trailer's right side can be attached to one another and to the trailer frame 400 by one or more load bearing axles 230. Various sizes of wheels/tires may be used depending on customer load or operations demand.

A power pipe axle 330 can connect both the left and right axle cams 370 to the axle torque arm 340. Thus, when the vehicle operator activates the axle arm 340, it rotates the power pipe axle 330, which in turn moves the left and right axle cams 370 towards the weight bearing wheel assembly 200 bringing the individual wheel/tires 312, 313, 314, and 315 of the power pipe rolling wheel assembly 300 into contact with the wheels/tires 212, 213, 214, and 215 of the weight bearing wheel assembly 200. In one embodiment, each of the power pipe axles 330 extends through the plurality of trailer frames 400 and each of the load bearing axles 230 is attached to the plurality of trailer frames 400 via a suspension system to help minimize the effects of traversing rough, uneven terrain.

In one embodiment, the trailer 10 utilizes a plurality of power pipe rolling wheel assemblies 300 having only one power pipe rolling tire 312. In another embodiment there are a pair of power pipe rolling tires 312 and 313. In yet another embodiment, each side only utilizes a single pipe rolling tire 312 and 314. Another option employs a dual configuration on one side, say pipe rolling tires 312 and 313 and a single configuration on the other side with pipe rolling tire 314. In still another embodiment, a pair of power pipe rolling tires 312 and 313 is on one side and a second pair of power pipe rolling tires 314 and 315 is on the second side.

Figure 6:
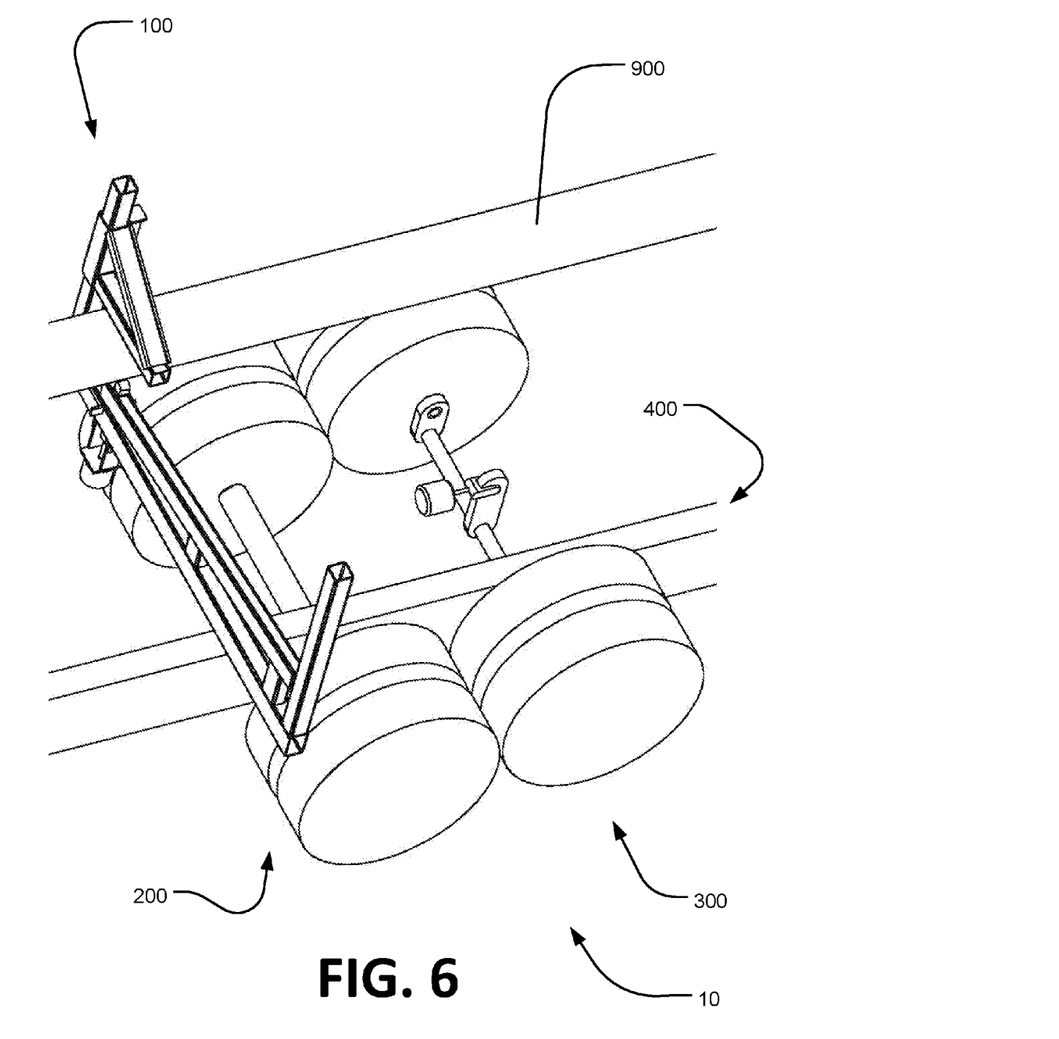
FIG. 6 illustrates a close-up perspective view of an exemplary embodiment of a trailer weight bearing wheel assembly, a power pipe rolling assembly, and a pipe cradle assembly with a single pipe segment in the process of being discharged from the trailer.

FIG. 6 illustrates a close-up perspective view of an exemplary embodiment of a trailer weight bearing wheel assembly 200, a power pipe rolling assembly 300, and a pipe cradle assembly 100 with a single pipe segment 900 in the process of being discharged from the trailer 10. This view shows potential relationships between various components in this particular embodiment. Only a single trailer frame 400 is illustrated in order to clearly show some other components.

Figure 7:
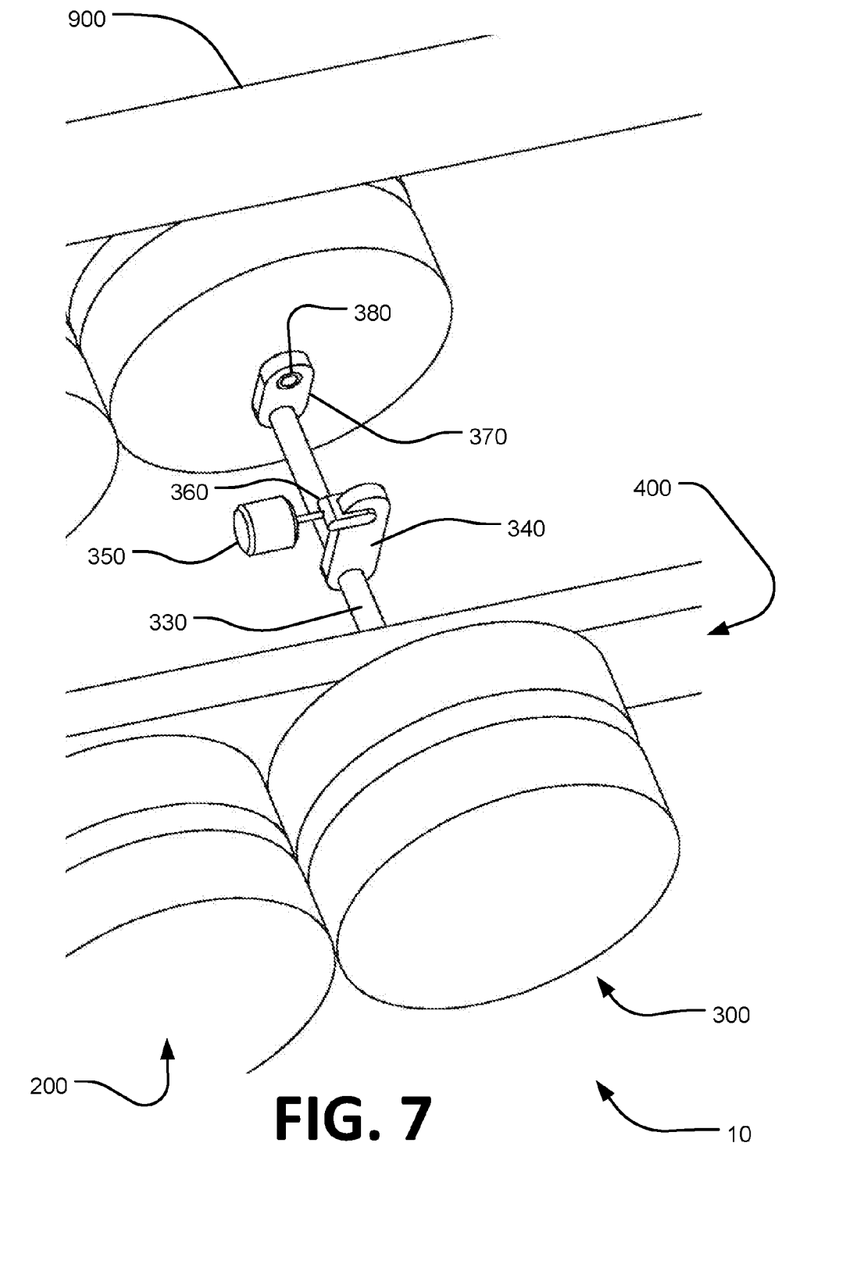
FIG. 7 illustrates a close-up perspective view of an exemplary embodiment of a power pipe rolling assembly.

FIG. 7 illustrates a close-up perspective view of an exemplary embodiment of a power pipe rolling assembly 300. Here, a powered actuator 350 such as an air can is illustrated. The powered actuator 350 forces a torque arm connector 360 towards and away from the actuator 350. Since the connector 360 is attached to the torque arm, the actuator 350 moves the axle torque arm 340 when actuated. Actuation occurs in response to commands from the vehicle's operator. When the actuator 350 is collapsed, the power pipe rolling assembly 300 is pressed against the weight bearing wheel assembly 200 to provide power to roll the pipe off of the trailer. If the actuator is an air can, it can be powered off of the pulling vehicles air system, if any (note: most semi-trailer tractor trucks employ such an air system for braking, etc.). The actuator 350 can continually apply pressure to keep the power pipe rolling assembly 300 engaged against the weight bearing wheel assembly 200 until it is released.

A power pipe hub spindle 380 extends outwards from each axle cam 370 and attaches to the pipe rolling tires, allowing them to spin (using one or more bearings) while still firmly attaching them to the axle cam 370.

The rolling assembly 300 can utilize axle cams 370 to translate rotational movement of the power pipe axle 330 to motion of the pipe rolling tires towards or away from the weight bearing tires.

FIG. 8 illustrates a close-up perspective view of an exemplary embodiment of a front end of a self-unloading pipe trailer 10 highlighting an exemplary pipe cradle assembly 100. The cradle assembly 100 has the components previously described as well as the pipe stop assembly 180. When the pipe stop is retracted it allows one pipe to enter the discharge chamber and be placed in the unload position.

Figure 9:
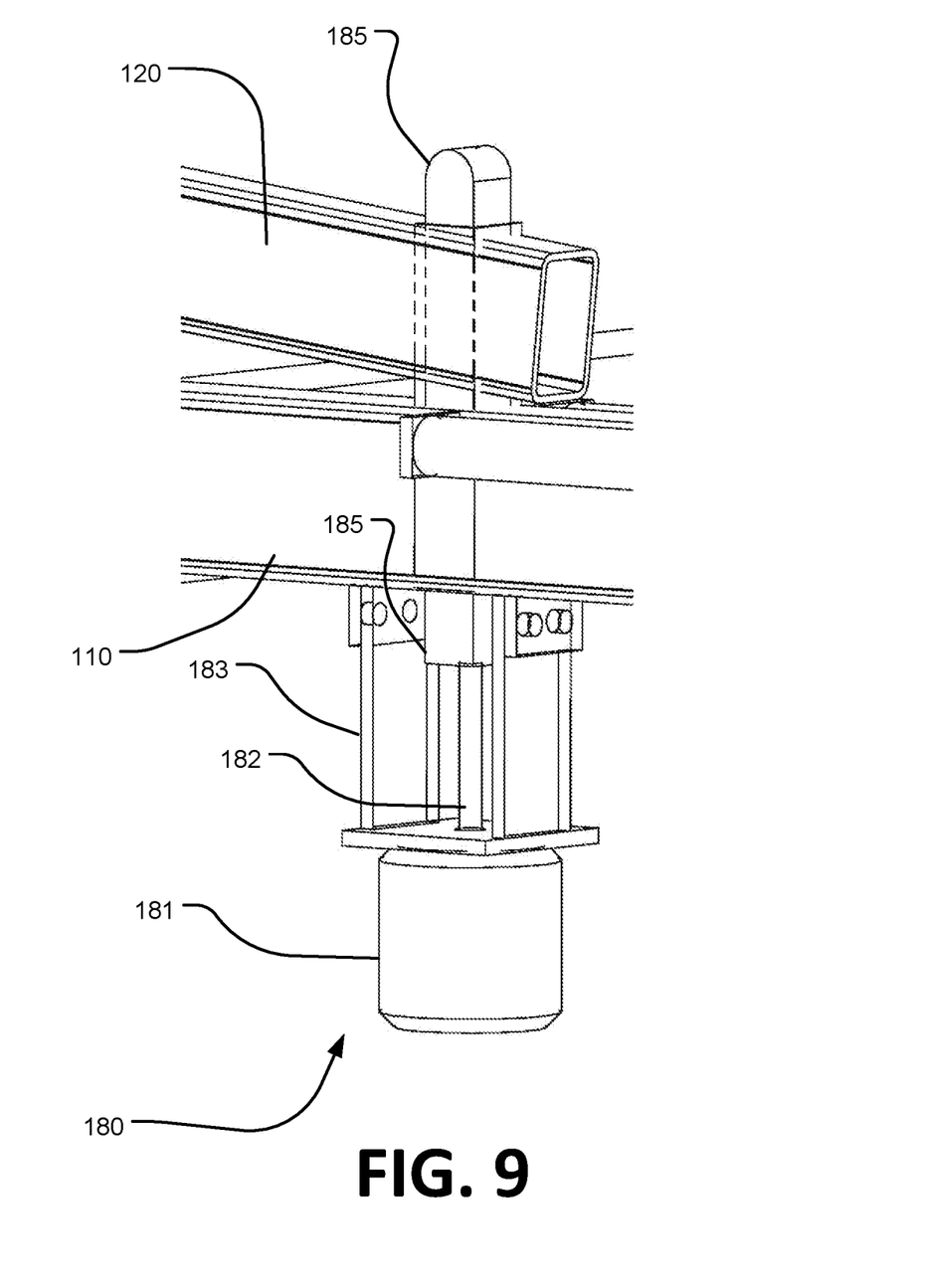
FIG. 9 illustrates a close-up perspective view of an exemplary embodiment of a pipe stop assembly.

FIG. 9 illustrates a close-up perspective view of an exemplary embodiment of a pipe stop assembly 180. The pipe stop assembly can comprise a pipe stop actuator 181 (such as an air can), a pipe stop drive member 182, a plurality of pipe stop supports 183, and a pipe stop shaft 185. The pipe stop drive member 182 connects the actuator 181 to the pipe stop shaft 185 such that activation of the actuator 181 moves the pipe stop shaft 185 up and down relative to the top edge of the pipe roller bar 120. In its fully extended position the actuator 181 forces the shaft 185 to extend upwards beyond the top of the roller bar 120 and block any more pipe segments from entering the discharge chamber. However, once the system calls for a new pipe segment to be dropped into the discharge chamber (i.e., a demand for a pipe drop), the actuator 181 can retract the pipe stop drive member 182, thereby retracting the pipe stop shaft 185 downwards into (or next to, or at least in a lower relative position than when the actuator 181 is fully extended). This unblocks the pipe roller bar 120 and allows the next pipe segment in the rack to roll down and drop into the discharge chamber.

In one embodiment, a plurality of sensors and timers can be utilized to fine-tune control over the above "drop into the discharge chamber, raise the pipe stop shafts 185, unload the pipe segment 900, and lower the pipe stop shafts 185" cycle. For example, an infrared sensor can monitor when the pipe being unloaded clears the discharge chamber and can call for a new pipe segment to be dropped into the discharge chamber. The operator can program in a delay between this call and the dropping of the pipe stop shafts 185 that allow the next pipe segment to enter the discharge chamber. Similarly, there can be a delay added between when the pipe enters the discharge chamber and when it begins feeding out the back of the trailer. Additionally, delays can be added to the raising of the pipe stop shafts 185 after a pipe segment has dropped into the discharge chamber. In other embodiments, other sensors besides and/or including infrared sensors can be utilized. Similarly, one or more timing delays can be built in and/or can be configured to fine-tune the above described operations to ensure the smooth feeding of the pipe segments.

The plurality of pipe stop supports 183 can be adjustable in height to raise or lower the amount of the pipe stop shaft 185 extending above the pipe roller bar 120.

The self-unloading pipe trailer 10 is designed to unload steel or poly pipe, although other types and styles of pipe can be used with the system as well. As discussed above, the system can comprise a complete trailer, or it can be embodied in a skid unit that is designed to fit on top of an existing hauling trailer, backhoe trailer or other flatbed type trailer.

Although not detailed in the drawings, spring and/or air bag suspension systems can be utilized on the trailer.

The length of the entire trailer can be adjustable in some embodiments so that the frame extends or retracts in length to accommodate pipe segments of various lengths. For particularly short pipe segments, a short trailer is preferable. Conversely, for longer pipe segments, a longer trailer is necessitated.

Longer trailers can be difficult to maneuver, especially when the plurality of weight bearing wheel assemblies 200 are spaced relatively far apart from one another. Thus, in some embodiments, the weight bearing wheel assemblies can be repositionable to be in closer proximity to each other for ease of transport and maneuverability and can then be spaced further apart to provide for better unloading characteristics.

Although not detailed in the drawing figures, a slide chute may be utilized to facilitate the unloading of a pipe off of the rear of the trailer. Such a chute could cradle and support the pipe while guiding it gently down to the ground as the pipe is slid off of the trailer during an unload process.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, as well as those listed above, are incorporated herein by reference in their entirety. Aspects of embodiments can be modified, if necessary, to employ the systems, functions, and concepts of the various references to provide yet further embodiments.

In light of the above "Detailed Description," the inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventors. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventors contemplate the various aspects in any number of claim forms. Accordingly, the inventors reserve the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

What is claimed is:

1. A self-unloading pipe trailer that automatically unloads segments of pipe in a line while being pulled along a location of a pipeline, the self-unloading pipe trailer comprising:
    a trailer frame extending longitudinally from a proximal end to a distal end;
    the proximal end having a trailer hitch device for attaching the trailer to a pulling vehicle so that the trailer can be moved over a surface;
    the trailer frame having a first side and a second side;
    a plurality of weight bearing wheel assemblies each attached perpendicularly to the trailer frame and having a first wheel arrangement in proximity to the first side of the trailer frame and a second wheel arrangement in proximity to the second side of the trailer frame;
    at least one of the plurality of weight bearing wheel assemblies carrying a portion of a weight of the pipe trailer and transferring that weight through the first and second wheel arrangements to the surface over which the pipe trailer is pulled;
    a plurality of power pipe rolling wheel assemblies each movably attached to the trailer frame;
    at least one of the plurality of power pipe rolling wheel assemblies comprising a drive wheel;
    at least one of the plurality of power pipe rolling wheel assemblies being movable between a pipe unload position and a transport position;
    when actuated into the pipe unload position, the drive wheel contacts at least one of the first and second wheel arrangements such that as the trailer moves over the surface, at least one of the first and second wheel arrangements rotate, causing the first drive wheel to rotate in an opposite direction thereto;
    a plurality of pipe cradle assemblies attached to the trailer frame, the plurality of pipe cradle assemblies each comprising a high side cradle upright and a low side cradle upright;
    the plurality of pipe cradle assemblies each further comprising a pipe roller bar and a pipe retention assembly;
    the cradle uprights, pipe roller bars and pipe retention assemblies acting in concert to hold a plurality of pipe segments within the plurality of pipe cradle assemblies and to roll a first pipe segment into a discharge chamber when a demand for a pipe drop is made;
    when the first pipe segment enters the discharge chamber, the first pipe segment is guided into contact with at least the first drive wheel of the first power pipe rolling wheel assembly;
    moving the trailer across the surface causes at least one of the first and second wheel arrangements to rotate, causing the first drive wheel to rotate, and rotation of the first drive wheel causes the segment of pipe contacting the first drive wheel to be fed backwards off of the self-unloading pipe trailer;
    wherein each of the plurality of power pipe rolling wheel assemblies further comprises:
    an actuator driving an axle torque arm;
    the axle torque arm connected to a power pipe axle;
    the power pipe axle connected to a plurality of axle cams;
    wherein at least one of the plurality of axle cams is attached to a power pipe hub spindle which extends outwards therefrom and the power pipe hub spindle attaches to a pipe rolling tire;
    wherein when the actuator is activated, the actuator drives the axle torque arm away, the axle torque arm thereby rotates the power pipe axle causing the at least one axle cam to be moved away from the actuator, moving the power pipe hub spindle attached thereto and causing the pipe rolling tire attached to the power pipe hub spindle to also move away from the actuator; and
    wherein the actuator is fixedly attached to the trailer such that the pipe rolling tire is in proximity with at least one of the plurality of weight bearing wheel assemblies and not in contact therewith prior to activation of the actuator and so that activation of the actuator causes the pipe rolling tire to move into contact with the at least one of the plurality of weight bearing wheel assemblies.

2. The self-unloading pipe trailer of claim 1, wherein each of the pipe retention assemblies further comprises a pipe retention bar defining a top limit to the discharge chamber, and at least one of the pipe retention bars ensures that the pipe segment is held in contact with the first drive wheel until the pipe segment has been discharged beyond the first drive wheel.

3. A self-unloading pipe trailer that automatically unloads segments of pipe in a line while being pulled along a location of a pipeline, the self-unloading pipe trailer comprising:
    a trailer frame extending longitudinally from a proximal end to a distal end;
    the proximal end having a trailer hitch device for attaching the trailer to a pulling vehicle so that the trailer can be moved over a surface;
    the trailer frame having a first side and a second side;

a plurality of weight bearing wheel assemblies each attached perpendicularly to the trailer frame and having a first wheel arrangement in proximity to the first side of the trailer frame and a second wheel arrangement in proximity to the second side of the trailer frame;

at least one of the plurality of weight bearing wheel assemblies carrying a portion of a weight of the pipe trailer and transferring that weight through the first and second wheel arrangements to the surface over which the pipe trailer is pulled;

a plurality of power pipe rolling wheel assemblies each movably attached to the trailer frame;

a first power pipe rolling wheel assembly comprising a first drive wheel on the first side of the trailer frame and a second drive wheel on the second side of the trailer frame;

the first power pipe rolling wheel assembly being movable between a pipe unload position and a transport position;

when actuated into the pipe unload position, the first drive wheel contacts the first wheel arrangement and the second drive wheel contacts the second wheel arrangement such that as the trailer moves over the surface, the first and second wheel arrangements rotate, causing the first and second drive wheels to rotate in an opposite direction thereto;

a plurality of pipe cradle assemblies removably attached to the trailer frame, the plurality of pipe cradle assemblies each comprising a high side cradle upright and a low side cradle upright;

the plurality of pipe cradle assemblies each further comprising a pipe roller bar and a pipe retention assembly;

the cradle uprights, pipe roller bars and pipe retention assemblies acting in concert to hold a plurality of pipe segments within the plurality of pipe cradle assemblies and to roll a first pipe segment into a discharge chamber when a demand for a pipe drop is made;

when the first pipe segment enters the discharge chamber, the first pipe segment is guided into contact with at least the first drive wheel of the first power pipe rolling wheel assembly;

moving the trailer across the surface causes at least one of the first and second wheel arrangements to rotate, causing the first drive wheel to rotate, and rotation of the first drive wheel causes the segment of pipe contacting the first drive wheel to be fed backwards off of the self-unloading pipe trailer;

wherein each of the plurality of power pipe rolling wheel assemblies further comprises:
an actuator driving an axle torque arm;
the axle torque arm connected to a power pipe axle;
the power pipe axle having a left end and a right end;
the left end of the power pipe axle connected to a first axle cam;
the right end of the power pipe axle connected to a second axle cam;
wherein the first axle cam is attached to a first power pipe hub spindle which extends outwards therefrom and the first power pipe hub spindle attaches to a first pipe rolling tire;
wherein the second axle cam is attached to a second power pipe hub spindle which extends outwards therefrom and the second power pipe hub spindle attaches to a second pipe rolling tire;
wherein when the actuator is activated, the actuator drives the axle torque arm away, the axle torque arm thereby rotates the power pipe axle causing the first and second axle cams to be moved away from the actuator, moving the first and second power pipe hub spindles attached thereto and causing the first and second pipe rolling tires attached to the power pipe hub spindles to also move away from the actuator; and
wherein the actuator is fixedly attached to the trailer such that the pipe rolling tires are in proximity with at least one of the plurality of weight bearing wheel assemblies and not in contact therewith prior to activation of the actuator and so that activation of the actuator causes the pipe rolling tires to move into contact with the at least one of the plurality of weight bearing wheel assemblies.

4. The self-unloading pipe trailer of claim 3, wherein each of the pipe retention assemblies further comprises a pipe retention bar defining a top limit to the discharge chamber, and at least one of the pipe retention bars ensures that the pipe segment is held in contact with at least one of the first drive wheel and the second drive wheel until the pipe segment has been discharged beyond at least one of the first drive wheel and the second drive wheel.

5. A self-unloading pipe trailer that automatically unloads segments of pipe in a line while being moved along a location of a pipeline, the self-unloading pipe trailer comprising:
a trailer frame extending longitudinally from a proximal end to a distal end, and wherein the trailer frame comprises a slide which can carried by a vehicle;
the trailer frame having a first side and a second side;
a plurality of power pipe rolling wheel assemblies each movably attached to the trailer frame;
a first power pipe rolling wheel assembly comprising a drive wheel;
the first power pipe rolling wheel assembly being movable between a pipe unload position and a transport position, and when actuated into the pipe unload position, the drive wheel contacts a vehicle wheel such that as the vehicle moves over a surface, the vehicle wheel rotates, causing the drive wheel to rotate in an opposite direction thereto;
a plurality of pipe cradle assemblies attached to the trailer frame, the plurality of pipe cradle assemblies each comprising a high side cradle upright and a low side cradle upright;
the plurality of pipe cradle assemblies each further comprising a pipe roller bar and a pipe retention assembly;
the cradle uprights, pipe roller bars and pipe retention assemblies acting in concert to hold a plurality of pipe segments within the plurality of pipe cradle assemblies and to roll a first pipe segment into a discharge chamber when a demand for a pipe drop is made;
when the first pipe segment enters the discharge chamber, the first pipe segment is guided into contact with the drive wheel of the first power pipe rolling wheel assembly;
as the drive wheel rotates this causes the segment of pipe contacting the drive wheel to be fed backwards off of the self-unloading pipe trailer;
wherein each of the plurality of power pipe rolling wheel assemblies further comprises:
an actuator driving an axle torque arm;
the axle torque arm connected to a power pipe axle;
the power pipe axle connected to a plurality of axle cams;
wherein at least one of the plurality of axle cams is attached to a power pipe hub spindle which extends outwards therefrom and the power pipe hub spindle attaches to a pipe rolling tire;

wherein when the actuator is activated, the actuator drives the axle torque arm away, the axle torque arm thereby rotates the power pipe axle causing the at least one axle cam to be moved away from the actuator, moving the power pipe hub spindle attached thereto and causing the pipe rolling tire attached to the power pipe hub spindle to also move away from the actuator; and wherein the actuator is fixedly attached to the trailer such that the pipe rolling tire is in proximity with a second vehicle tire and not in contact therewith prior to activation of the actuator and so that activation of the actuator causes the pipe rolling tire to move into contact with the second vehicle tire.

6. The self-unloading pipe trailer of claim 5, wherein each of the pipe retention assemblies further comprises a pipe retention bar defining a top limit to the discharge chamber, and at least one of the pipe retention bars ensures that the pipe segment is held in contact with the drive wheel until the pipe segment has been discharged beyond the drive wheel.

* * * * *